United States Patent
Kuschnerus et al.

(10) Patent No.: US 12,535,836 B2
(45) Date of Patent: **\*Jan. 27, 2026**

(54) METHOD FOR OPERATING A FILLING SYSTEM AND FILLING SYSTEM

(71) Applicant: KROHNE Messtechnik GmbH, Duisburg (DE)

(72) Inventors: Dirk Kuschnerus, Krefeld (DE); Sven Walbrecker, Wesel (DE); Hansjörg Mucke, Mönchengladbach (DE); Martin Krawczyk-Becker, Herne (DE)

( * ) Notice: Subject to any disclaimer, the term of this patent is extended or adjusted under 35 U.S.C. 154(b) by 490 days.

This patent is subject to a terminal disclaimer.

(21) Appl. No.: 17/934,718

(22) Filed: Sep. 23, 2022

(65) Prior Publication Data

US 2023/0099328 A1    Mar. 30, 2023

(30) Foreign Application Priority Data

Sep. 24, 2021   (DE) .......................... 102021124777.2

(51) Int. Cl.
  *G05D 7/06*    (2006.01)
  *G05D 9/12*    (2006.01)

(52) U.S. Cl.
  CPC ............. *G05D 7/0623* (2013.01); *G05D 9/12* (2013.01)

(58) Field of Classification Search
  CPC ................................ G05D 7/0623; G05D 9/12
  USPC .......................................................... 700/283
  See application file for complete search history.

(56) References Cited

U.S. PATENT DOCUMENTS

| | | | | |
|---|---|---|---|---|
| 5,823,234 | A * | 10/1998 | Boertz | B67C 3/202 141/1 |
| 2016/0368751 | A1* | 12/2016 | Fickert | B67C 3/286 |
| 2017/0144784 | A1* | 5/2017 | Illi | G01F 15/005 |
| 2019/0010039 | A1* | 1/2019 | Clusserath | B67C 3/287 |
| 2020/0346911 | A1* | 11/2020 | D'Errico | B67C 3/286 |
| 2022/0179435 | A1* | 6/2022 | Weber | G05D 9/12 |
| 2022/0396463 | A1* | 12/2022 | Poeschl | B67C 3/007 |

FOREIGN PATENT DOCUMENTS

| | | |
|---|---|---|
| DE | 102011017448 A1 | 10/2012 |
| DE | 102013100702 A1 | 7/2014 |
| EP | 4009009 A1 | 6/2022 |

* cited by examiner

*Primary Examiner* — Md Azad
(74) *Attorney, Agent, or Firm* — Patrick D. Duplessis (57) ABSTRACT

A method for operating a filling system includes: determining a current valve curve of a first filling valve and a current valve curve of a second filling valve; comparing the current valve curve of the first filling valve with a reference valve curve of the first filling valve and comparing the current valve curve of the second filling valve with a reference valve curve of the second filling valve; adjusting a number of filling points at which the current valve curve differs from the associated reference valve curve; detecting and signaling a filling point error in the event of a deviation of the valve curve from the reference valve curve at one filling point; and detecting and signaling a process error in the case of deviation of the valve curve from the reference valve curve at both filling points.

11 Claims, 4 Drawing Sheets

METHOD FOR OPERATING A FILLING SYSTEM AND FILLING SYSTEM

TECHNICAL FIELD

The invention relates to a method for operating a filling system, wherein the filling system has at least one first filling point, at least one second filling point and at least one control and evaluation unit for controlling and monitoring the filling processes, wherein the first filling point has at least one first filling valve and at least one first flow or fill level sensor and wherein the second filling point has at least one second filling valve and at least one second flow or fill level sensor, and wherein a reference valve curve of the first filling valve and a reference valve curve of the second filling valve are stored in the control and evaluation unit. In addition, the invention relates to a filling system.

BACKGROUND

Filling systems are frequently used in process engineering and are used to fill one or more media into containers provided for this purpose. A filling system usually has several filling points, at each of which a filling process is implemented. For this purpose, a filling point has a filling valve for controlling the flow and a flow sensor or a fill level sensor for determining the quantity of the medium to be filled or already filled.

It is known from the state of the art to monitor the filling processes and thus the operation of the filling system and/or individual filling points with the aid of external test equipment. For this, for example, the fill level of the container after filling is monitored by means of a camera and/or the weight of the container after filling is determined and thus the fill level is inferred. If the fill level deviates from an expected fill level beyond a tolerance limit, an error in the filling process is inferred.

A disadvantage of the procedure known from the prior art is that, on the one hand, external testing equipment must be used, which entails additional costs and additional maintenance. On the other hand, it is disadvantageous that although it can be detected that there is an error in the filling process, the cause of the error cannot be readily identified and the source of the error cannot be localized.

SUMMARY

The object of the invention is to provide a method with which error monitoring of a filling system can be implemented in a simplified manner compared with the state of the art. In addition, the object of the invention is to provide a filling system that can be monitored for errors in a simple manner.

If it is stated that a reference valve curve of the first filling valve and a reference valve curve of the second filling valve are stored in the control and evaluation unit, then the reference valve curves may have been determined and stored in the past. Likewise, the reference valve curves may have been determined and stored immediately or in the vicinity of the time before the process steps described below were carried out. In particular, one of the reference valve curves can also have been determined and stored in the past and the other reference valve curve can have been stored immediately or in the vicinity of the time before the process steps are carried out. It is only relevant that the reference valve curves are stored in the control and evaluation unit before the process steps described below are carried out.

A valve curve describes the flow rate depending on the degree of opening of the valve, in particular the valve stroke. In the case of a linear valve curve, for example, the flow rate is directly proportional to the valve stroke; in the case of an equal-percentage valve curve, any change in the valve stroke results in an equal-percentage change in the flow rate.

The method according to the invention is initially and essentially characterized, namely by the disclosed features, in that in a determination step in the operating state of the filling system, the control and evaluation unit determines a current valve curve of the first filling valve and a current valve curve of the second filling valve. The current valve curves do not have to be determined over the entire range, as is the case with the reference valve curves. Rather, the current valve curves must be determined over a meaningful range, with a meaningful range being understood to mean a range that is large enough to detect a possible deviation of a current valve curve from a reference valve curve. For this, it is, in particular, sufficient to determine a sufficient number of points of the current valve curve that allow the detection of a deviation. The extent to which a number of points is sufficient is at the discretion of the person skilled in the art and depends on the respective process situation. Preferably, however, at least two, and more preferably at least three, points of the current valve curve are determined.

According to the invention, the control and evaluation unit compares the current valve curve of the first filling valve with the reference valve curve of the first filling valve and the current valve curve of the second filling valve with the reference valve curve of the second filling valve in a comparison step. In the comparison step, the control and evaluation unit detects whether or not the current valve curve deviates from the reference valve curve beyond a predefined tolerance range. The predefined tolerance range can be selected by a user, for example, and stored in the control and evaluation unit.

In an adjustment step, the control and evaluation unit also compares, according to the invention, the number of filling points at which a deviation of a current valve curve from an associated reference valve curve occurs.

According to the invention, it is further provided that the control and evaluation unit detects and signals a process error in a signaling step in the case of a deviation of the valve curve from the reference valve curve at both filling is points and detects and signals a filling point error of the corresponding filling point in the case of a deviation of the valve curve from the reference valve curve at one filling point. Signaling can be implemented, for example, by issuing an acoustic or optical signal, but signaling can also be implemented, for example, by issuing or storing a corresponding message, for example, in an internal memory of the control and evaluation unit.

The method according to the invention makes it possible in a simple manner to detect an error and to distinguish the source of an error occurring in a filling system. According to the invention, it can thus be detected without great effort whether an occurring error is a process error or a filling point error.

The basic idea of the disclosed method is that when a large number of filling points are used in the filling system, a current valve curve is captured for all filling points. If a deviation outside the tolerance range from the reference valve curve is detected only at one current valve curve of the plurality of filling points, it is highly probable that an error has occurred at this filling point. However, if all current valve curves of the plurality of filling points show a similar deviation from their respective reference valve curve, an error is present which is not related to the individual filling points; in any case, it is highly unlikely that all filling points of the plurality of filling points show a similar error at the same time.

In a particularly preferred design, the control and evaluation unit has at least a first sub-unit and a second sub-unit. The first sub-unit implements the control and monitoring of the first filling point and the second sub-unit implements the control and monitoring of the second filling point. The first sub-unit and the second sub-unit are also connected to each other via a communication channel. The sub-units can exchange data and information via the communication channel. The communication channel can be implemented wired or wireless. In such a design of the control and evaluation unit, the method according to the invention is characterized in a particularly preferred variation in that the first sub-unit and the second sub-unit exchange and adjust information about the state of the filling valves in the adjustment step. Particularly preferably, a deviation of the current valve curves from the corresponding reference valve curves is adjusted. In particular, it is thus adjusted whether there is a deviation or not.

In one variation, the first sub-unit requests the second sub-unit to transmit the information and the second sub-unit transmits the requested information to the first sub-unit. The first sub-unit then carries out the adjustment of the information. Preferably, the first sub-unit then further carries out the signaling step.

In a further variation, the first sub-unit requests the second sub-unit to transmit the information and, in addition, the second sub-unit requests the first sub-unit to transmit the information. Both sub-units independently carry out the adjustment of the information. Further preferably, the two sub-units exchange their respective results of the adjustment with the other sub-unit. In one variation, one of the two sub-units carries out the signaling step. In an alternative variation, both sub-units carry out the signaling step. In the design in which both sub-units carry out the adjustment step, redundancy of the adjustment is carried out.

A particularly advantageous design of the method according to the invention is one in which the degree and/or the direction of deviation of the current valve curves of the filling valves from the reference valve curves of the filling valves are adjusted in the adjustment step. Further preferably, a process error is detected and issued in the signaling step if the dimension and/or the direction of the deviation is the same for both filling valves within a predetermined tolerance range.

This procedure according to the invention can reduce the probability that two valve errors occurring independently of each other at both filling valves are incorrectly evaluated as process errors.

This design is based on the understanding that a process error within a tolerance range has the same effect on the individual filling points and generates an essentially equal error. A substantially equal error is noticeable by a substantially equal deviation of the current valve curve from the reference valve curve for each filling point. If a deviation of the current valve curve of one filling point differs in dimension and/or direction from the deviation of the current valve curve from the reference valve curve of the other filling point, two independent filling point errors are likely to be present, but not a process error.

Previously, it was explained how a process error can be detected by the method according to the invention. The severity of the error can vary. For example, it may be a minor error that can be corrected with determined measures so that operation of the filling system is not jeopardized and can continue. In the case of a serious error, on the other hand, it may be necessary to shut down the filling system.

A preferred variation of the method according to the invention is characterized in that in the event of a deviation of the valve curves beyond a first predetermined tolerance range, a recalibration of the valves is carried out. The recalibration is preferably carried out by the control and evaluation unit.

In one variation, the tolerance range is specified by a user. Particularly preferably, the tolerance range is stored in the control and evaluation unit.

In one variation, the tolerance range is selected based, for example, on the average dispersion of the filling quantity occurring in the filling system. Preferably, the valve curves over time and/or the filled volume are used to evaluate the valve curves. In a preferred design of the method according to the invention, the control and evaluation unit adapts the valve curve for calibrating the valves. This takes the deviations into account. The valves are calibrated on the basis of the new valve curve so that the control of the filling system does not have to be adjusted. The valves now respond to the same control command with a different degree of opening. This design of the method according to the invention makes it possible to compensate for small process errors and thus maintain the accuracy of the filling processes.

A particularly preferred design of the method according to the invention is characterized in that in the event of a deviation of the valve curves from the reference valve curves beyond a predetermined second tolerance range, a serious process error is detected and signaled and/or operation of the filling system is stopped. The second tolerance range is preferably stored in the control and evaluation unit. Further preferably, the second tolerance range is defined by a user. The second tolerance range can, for example, be defined using the same criteria as the first tolerance range. If the deviations are above the second tolerance range, the error is so serious that reliable operation of the filling system, in particular reliable filling, is no longer possible. The filling processes can no longer be carried out reliably. If a serious process error is detected and signaled, but the filling system is not automatically stopped, a user can decide whether to stop the filling system.

A further teaching of the invention deals with a further improvement of the error detectability and the accuracy of the filling processes. According to the invention, it is provided that a reference valve speed for the first filling valve and/or for the second filling valve is stored in the control and evaluation unit. The design of the method according to the invention is characterized in that the valve speed of the first filling valve and/or the second filling valve is determined in an additional step. The determination step can be carried out as a separate determination step, or can be implemented in connection with the determination step for determining the reference valve curve. According to the invention, it is further provided that the determined valve speed or the determined valve speeds are compared with the reference valve speed of the corresponding filling valve or with the reference valve speeds of the corresponding filling valves and that in case of a deviation of the valve speed from the reference valve speed(s), a recalibration of the corresponding filling valve or the corresponding filling valves is carried out. The valve speed is calculated from the time taken to change the valve opening by one step or by a predetermined number of steps. This variation allows errors that occur in connection with the valve speed to be corrected without having to stop the filling system.

According to the invention, if a deviation of the valve curve is detected at only one filling point, a filling point error is detected and signaled. According to the invention, a variation of the method according to the invention is further characterized in that, in the event of a filling point error being detected, the control and evaluation unit actuates the filling valve of the faulty filling point with a predetermined number and type of control commands and detects the reaction of the filling valve to the control commands. If the reaction of the filling valve deviates from the expected reaction, a valve error of the first type is detected. A first type of valve error is preferably an error that directly affects the actuator of the filling valve. In this variation, the filling point is preferably put out of operation. Additionally or alternatively, a request to replace the valve is issued.

If the filling valve reacts in the expected manner to the specified control commands, i.e. if the reaction of the filling valve does not deviate from the expected reaction, an alternative of the method according to the invention is characterized in that a valve error of the second type or a sensor error is detected. In the present context, a valve error of the second type refers to an error in the valve which has no effect on the actuator of the valve. It cannot be distinguished whether the cause of the error is to be found in the valve or in the sensor (flow sensor or fill level sensor), so it can only be detected that one of the two components is affected. It is further preferred in this variation that the filling point is put out of operation. Additionally or alternatively, a request to replace the valve and the sensor is issued.

In an alternative variation of the method according to the invention, it is provided that if a filling point error is detected, the faulty filling point is checked with the aid of an external test means. Any test means known from the prior art can be used as external test means, which can also be used in a manner known from the prior art. The use of additional external test means enables a more precise investigation of the cause of the error when a filling point error is present, since a filling point error can be caused by a sensor error or by a valve error.

Particularly preferably, the fill level of the filled container is determined with the aid of the external test means in order to check the filling point or find the cause of the error after the container has been filled. Based on the fill level and the direction of the deviation of the valve curve from the reference valve curve, a conclusion is drawn either on a valve error or on a sensor error. If, for example, the valve curve deviates downwards from the reference valve curve and at the same time the container is underfilled, or if the valve curve deviates upwards from the reference valve curve and at the same time the container is overfilled, this indicates that the valve is discharging too little or too much medium and the flow or fill level sensor is measuring correctly. Consequently, there is a valve error. If, on the other hand, the valve curve deviates downward from the reference valve curve and the container is overfilled at the same time, or if the valve curve deviates upward from the reference valve curve and the container is underfilled at the same time, this is an indication that the valve is operating correctly but the flow or fill level sensor is measuring too much or too little.

Particularly preferably, the faulty filling point is put out of service. Further preferably, a request is issued to replace the valve or to replace the flow or fill level sensor.

In addition to the method for operating a filling system, the invention also relates to a filling system. The filling system has at least one first filling point, at least one second filling point and at least one control and evaluation unit for controlling and monitoring the filling processes, wherein the first filling point has at least one first filling valve and at least one first flow sensor or a first fill level sensor, and wherein the second filling point has at least one second filling valve and at least one second flow sensor or a second fill level sensor, and wherein a reference valve curve of the first filling valve and a reference valve curve of the second filling valve are stored in the control and evaluation unit.

The object of the invention is achieved in the filling system according to the invention in that the control and evaluation unit is designed in such a way that, in a determination step, it determines a current valve curve of the first filling valve and a current valve curve of the second filling valve in the operating state of the filling system, that, in a comparison step, it compares the current valve curve of the first filling valve with the reference valve curve of the first filling valve, and compares the current valve curve of the second filling valve with the reference valve curve of the second filling valve that, in an adjustment step, it compares whether a deviation of a current valve curve from an associated reference valve curve occurs at one filling point or at both filling points, and in that, in a signaling step, it detects and signals a process error in the case of a deviation of the valve curve from the reference valve curve at both filling points and, in the case of a deviation of the valve curve from the reference valve curve at one filling point, detects and signals a filling point error of the corresponding filling point.

A particularly preferred design of the filling system according to the invention is characterized in that the control and evaluation unit has at least a first sub-unit and a second sub-unit, wherein the first sub-unit implements the controller of the first filling point and the second sub-unit implements the controller of the second filling point, wherein the first sub-unit and the second sub-unit are connected via a communication channel and are designed for the mutual exchange of data and communication, in particular in that the first sub-unit and the second sub-unit are designed in such a way that they exchange and adjust data about the state of the filling valves in the adjustment step.

In one variation, the control and evaluation unit or the sub-units of the control and evaluation unit can be implemented by control and evaluation units of the flow sensors or fill level sensors.

Further preferred designs of the filling system according to the invention are characterized in that the control and evaluation unit is designed in such a way that it can carry out one or more of the method steps described above in connection with the method according to the invention.

All of the advantageous designs described in connection with the method according to the invention and the advantages thereof apply analogously to the filling system according to the invention and vice versa.

BRIEF DESCRIPTION OF THE DRAWINGS

In detail, there is now a plurality of possibilities for designing and further developing the method according to the invention and the filling system according to the invention. In this connection, reference is made to the description of preferred embodiments in connection with the drawings.

DETAILED DESCRIPTION

Figure 1:
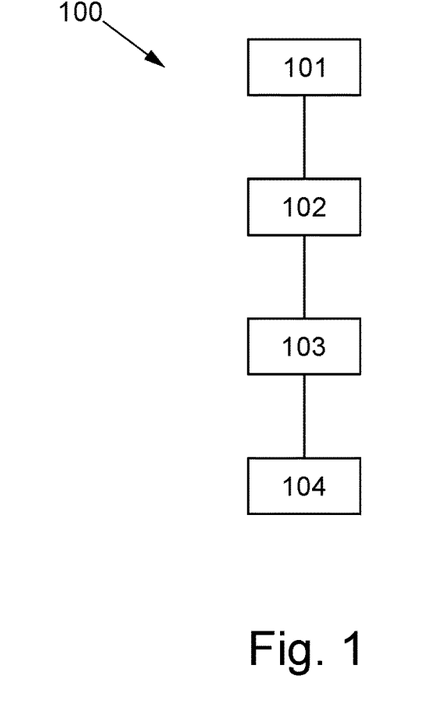
FIG. 1 illustrates a first block diagram of a method for operating a filling system.
Figure 5:
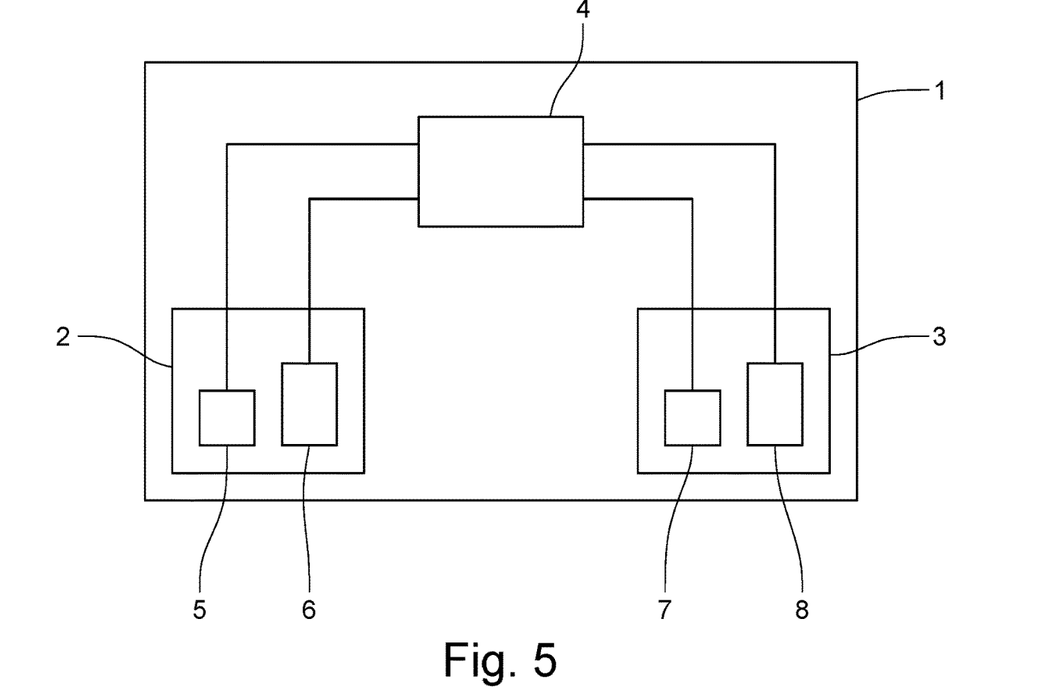
FIG. 5 illustrates a schematic representation of a first filling system.

FIG. 1 shows a block diagram of a method 100 for operating a filling system 1, as shown schematically in FIG. 5. As can be seen from FIG. 5, the filling system 1 has a first filling point 2 and a second filling point 3. In addition, the filling system 1 has a control and evaluation unit 4 which is used to control and monitor the filling processes. The first filling point 2 has a first filling valve 5 and a first flow sensor 6. The second filling point 3, on the other hand, has a second filling valve 7 and a second flow sensor 8. In the present case, the flow sensors 6, 8 are designed as flow sensors, but the use of fill level sensors is also possible. A reference valve curve of the first filling valve 5 and a reference valve curve of the second filling valve 7 are stored in the control and evaluation unit 4. The control and evaluation unit 4 is also designed in such a way that it can carry out the method described in FIG. 1.

In the method 100 shown in FIG. 1, a current valve curve of the first filling valve 5 and a current valve curve of the second filling valve 7 are determined in a determination step 101. In a comparison step 102, the current valve curves of the two filling valves 5, 7 are then compared with the respective reference valve curves. To compare a current valve curve with a reference valve curve, several points of the curves are preferably compared. In an adjustment step 103, the control and evaluation unit compares the number of filling points 2, 3 at which the current valve curve deviates from the corresponding reference valve curve. In the design shown, both the degree of deviation of a valve curve from the reference valve curve and the direction of the deviation are also determined. In the subsequent signaling step 104, in the case of a deviation of the valve curve from the reference valve curve at only one filling point 2, 3, a filling point error of the corresponding filling point 2, 3 is detected and signaled, and in the case of a deviation of both valve curves from the reference valve curves, a process error is detected and signaled.

Figure 2:
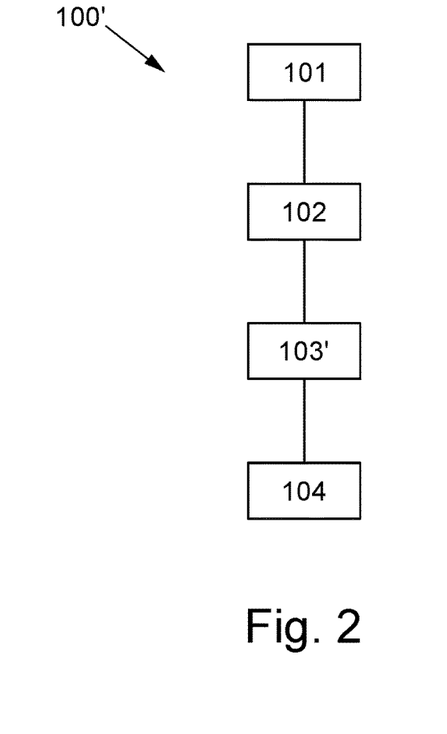
FIG. 2 illustrates a second block diagram of a method for operating a filling system.

FIG. 2 shows a broad block diagram of a method 100' for operating a filling system 1. The method 100' shown here is suitable for operating a filling system 1 as shown in FIG. 6.

Figure 6:
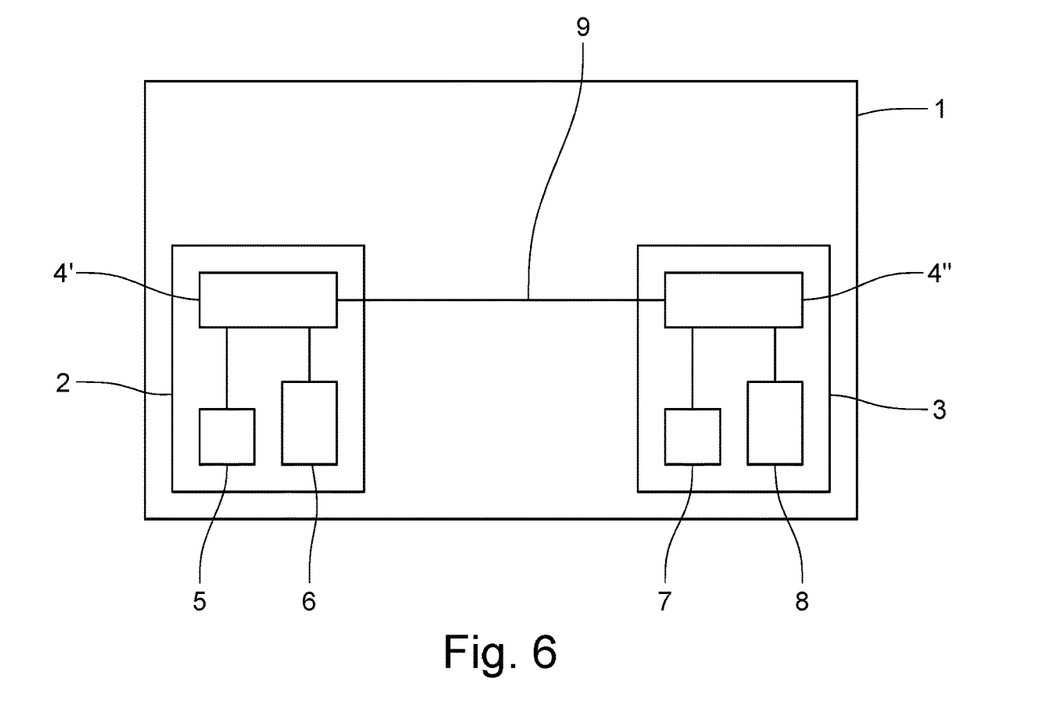
FIG. 6 illustrates a schematic representation of a second filling system.

FIG. 6 shows a further schematic representation of a filling system 1. The filling system 1 shown in FIG. 6 differs from the filling system 1 shown in FIG. 5 in that the control and evaluation unit 4 has a first sub-unit 4' and a second sub-unit 4". The two subunits 4', 4" are connected to each other via a communication channel 9. Data is exchanged between the two sub-units 4', 4" via this communication channel 9. The first sub-unit 4' is designed in such a way that it implements the control of a monitoring of the first filling point 2. The second sub-unit 4" is designed to implement the control and monitoring of the second filling point 3. Furthermore, the two sub-units 4', 4" are designed in such a way that they implement the method 100 described in FIG. 2.

The method 100' shown in FIG. 2 differs from the method shown in FIG. 1 in that in the adjustment step 103', the first sub-unit 4' and the second sub-unit 4" each compare whether there is a deviation of the current valve curve from the reference valve curve and then exchange information about the state of the filling valves 2, 3 with each other and compare this information with each other. In particular, information about a deviation of a current valve curve of one of the filling valves 2, 3 from a corresponding reference valve curve is exchanged here. The reference valve curve of the first filling valve 5 is stored in the first sub-unit 4', the reference valve curve of the second filling valve 7 is stored in the sub-unit 4". In the design shown, the first sub-unit 4' requests the information from the second sub-unit 4" and then determines whether a filling point error or a process error is present. A process error is detected if the deviation of the valve curves from the reference valve curves of both filling valves 2, 3 is the same within a specified tolerance range and/or if the direction of deviation of the valve curves from the reference valve curves of both filling valves 2, 3 is the same within a specified tolerance range.

Figure 3:
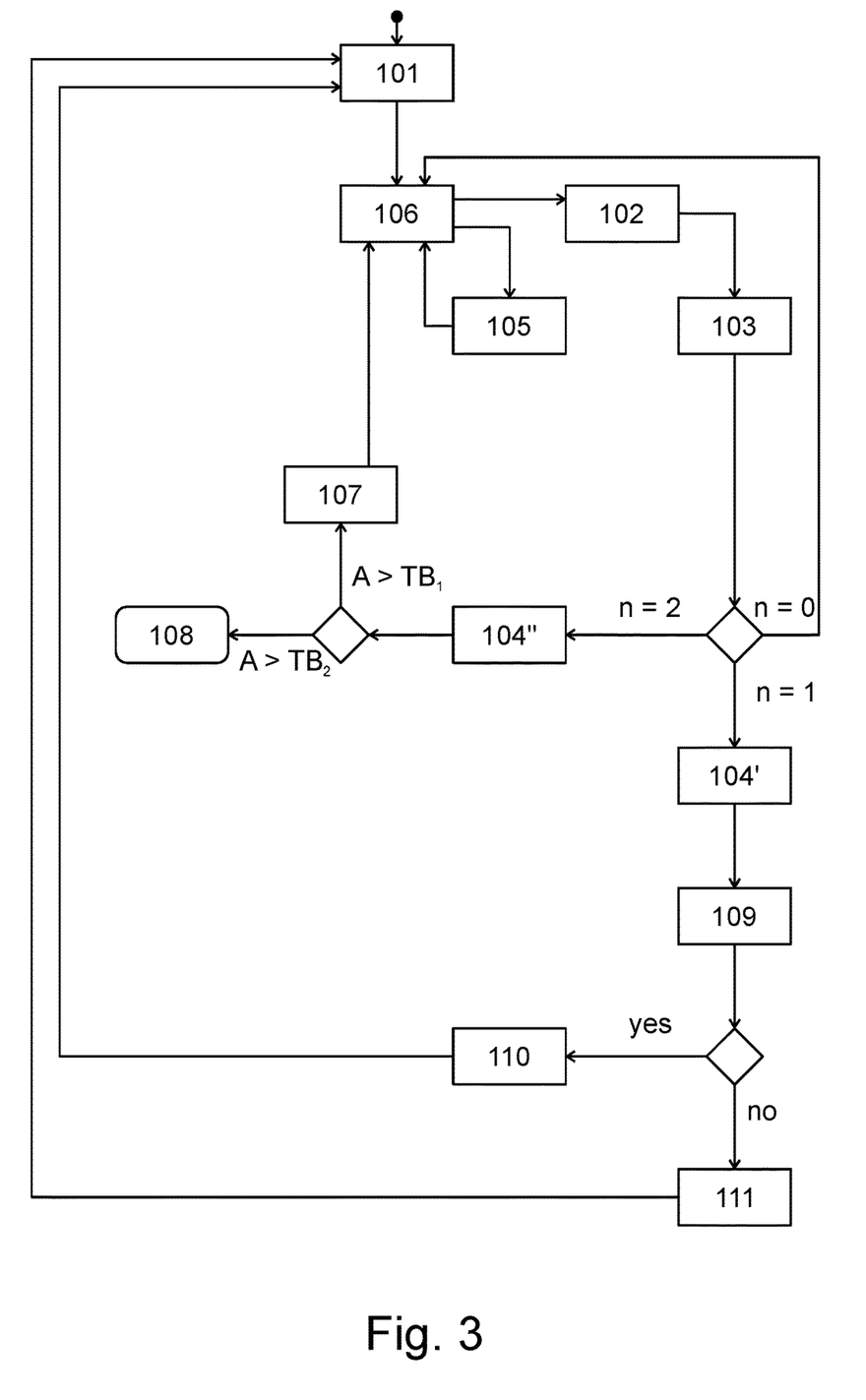
FIG. 3 illustrates a first flow diagram of a method for operating a filling system.

FIG. 3 shows a flow diagram of a method 100 for operating a filling system 1 as shown in FIG. 5. First, in the determining step 101, a current valve curve of the filling valves 5, 7 is determined. The system is then in control mode 106. In a comparison step 102, the control and evaluation unit compares the current valve curves of the filling valves 5, 7 with the reference valve curves stored in the control and evaluation unit. In the subsequent adjustment step 103, the control and evaluation unit 4 compares the number of filling points 2, 3 at which a deviation of the current valve curve from the corresponding reference valve curve has been detected.

In parallel, the control and evaluation unit determines the valve speeds of the filling valves 5, 7 in an additional step 105 and compares these with reference valve speeds stored in the control and evaluation unit 4. If a deviation of at least one valve speed from the corresponding reference valve speed is detected, the corresponding filling valve is recalibrated. Subsequently, the filling system 1 returns to the control mode 106.

If it is determined in the adjustment step 103 that there is no deviation A of the current valve curve from the reference valve curve at any of the filling points 2, 3—n=0—, the filling system 1 switches to control mode 106.

If it is determined that at both filling points 2, 3 there is a deviation A of the current valve curve from the reference valve curve—n=2—, a process error is detected and signaled in a signaling step 104". Subsequently, in the embodiment shown, the degree and direction of deviation A are determined. In the case of a deviation A of the current valve curves beyond a first tolerance range $TB_1$, the filling valves 5, 7 are recalibrated in a step 107 by adjusting the valve curves. Subsequently, the filling system 1 goes into control mode 106. In the event of a deviation A of the current valve curves beyond a second tolerance range $TB_2$, a serious process error is detected and signaled and/or operation of the filling system 1 is stopped in a step 108.

If it is determined that at one of the two filling points 2, 3 there is a deviation A of the current valve curve from the reference valve curve—n=1—, a filling point error of the corresponding filling point 2, 3 is detected and signaled in a signaling step 104'. For further detection of the cause of the error, the filling valve 5, 7 of the faulty filling point 2, 3 is then controlled with a predetermined number and type of control commands in a step 109 and the reaction of the filling valve 2, 3 to the control commands is monitored. It is checked whether the reaction of the filling valve 2, 3 to the control commands corresponds to the expected reaction.

If the reaction of the filling valve 5, 7 deviates from the expected reaction, a valve error of the first type is detected in a step 110. A valve fault of the first type is to be understood as a valve fault which affects the actuator of the filling valve 5, 7. The affected filling point 2, 3 is put out of operation and a request is also issued to replace the faulty filling valve 5, 7. After the filling valve 5, 7 has been replaced, the valve speed and valve curve of the replaced filling valve 5, 7 can be recorded again—101—and the filling system 1 can go into control operation 106.

If, on the other hand, the response of the filling valve 5, 7 does not deviate from the expected response, then either a valve error must be present which does not affect the controller of the filling valve 5, 7—such a valve error is referred to as a valve error of the second type—or a sensor error must be present. It is not possible to distinguish between these two types of error. Accordingly, an error of the type "valve error of the second type or sensor error" is detected in a step 111. The filling point 2, 3 concerned is put out of operation. In addition, the filling valve 5, 7 and the flow or fill level sensor 6, 8 are requested to be replaced. Once the filling valve 5, 7 and the flow or fill level sensor 6, 8 have been replaced, the valve speed and valve curve of the replaced filling valve 5, 7 can be restarted—101—and the filling system can go into control mode 106.

Figure 4:
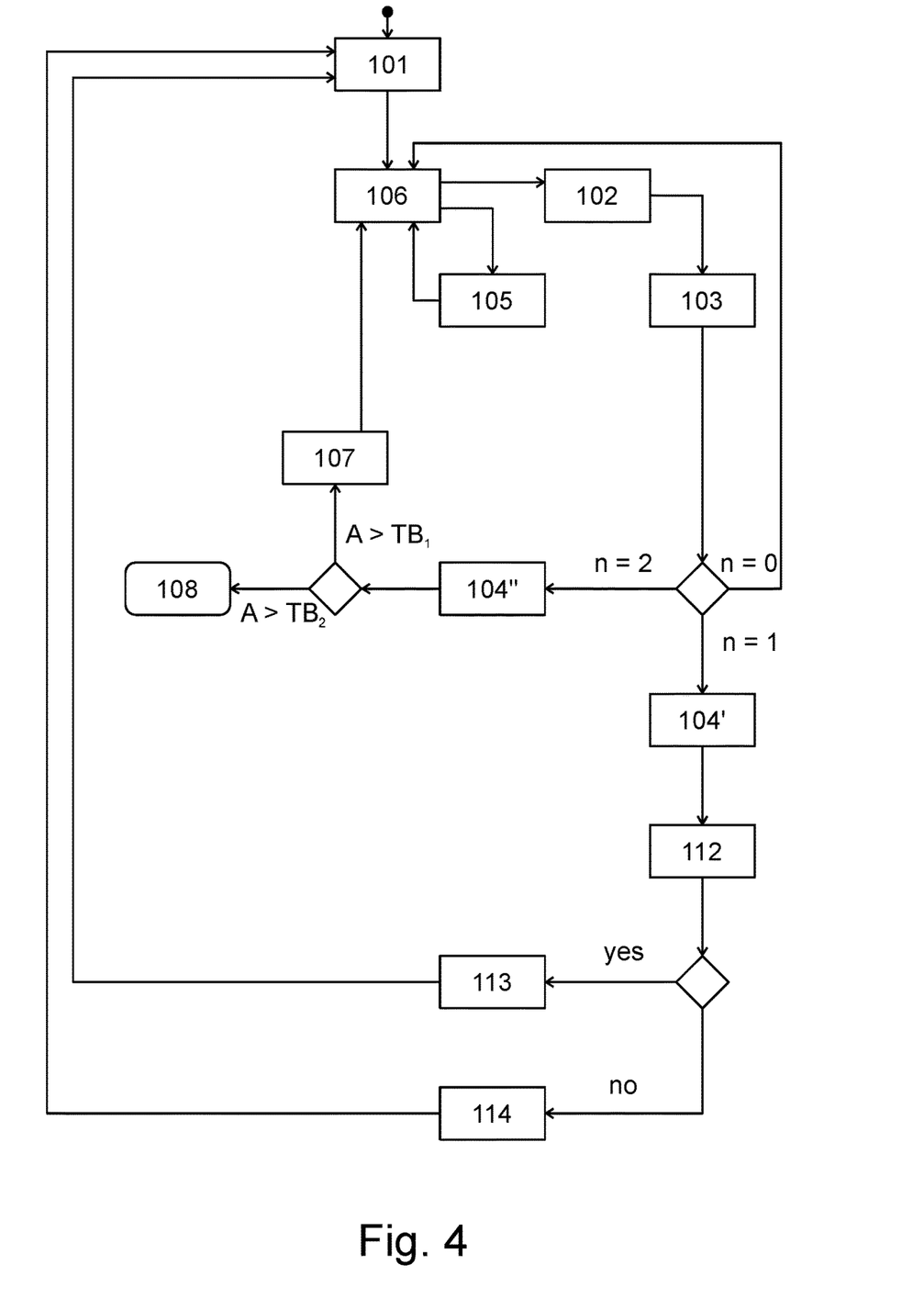
FIG. 4 illustrates a second flow diagram of a method for operating a filling system.

FIG. 4 shows a further flow diagram of a method 100 for operating a filling system 1. In the method 100 shown here, in comparison with the method shown in FIG. 3, an external test means is used to identify the cause of the error more precisely in the event that a filling point fault—104'—is detected. An external inspection means can be, for example, a camera with which the degree of filling of a filled container is determined, or, for example, a scale with which the weight of the container after filling is determined, whereby the degree of filling of the container can also be concluded. Any external test equipment known from the prior art can be used here.

In a step 112, the container is first filled by carrying out the filling process as usual. The filling level of the container is then determined with the aid of the external test equipment. In addition, deviations of the valve curve from the reference valve curve of the filling valve 5, 7 of the faulty filling point 2, 3 are determined. Based on the fill level of the filled container and the direction of the deviation of the valve curve from the reference valve curve, a valve error or a sensor error can be concluded. For this, it is checked whether the conditions for the presence of a valve error are present. These conditions are defined in advance by a user and can be stored in the control and evaluation unit 4. The following conditions must be met in order to identify a valve error: the valve curve deviates downwards and the container is underfilled; or the valve curve deviates upwards and the container is overfilled. If one of the conditions is detected, a valve error is detected and issued in step 113. In addition, a request to replace the filling valve 5, 7 is issued. Once the filling valve 5, 7 has been replaced, the valve speed and valve curve of the replaced filling valve 5, 7 can be determined again—101—and the filling system can go into control mode 106.

If the conditions for the presence of a valve error are not met, a further step 114 checks whether the conditions for the presence of a sensor error are met. These conditions may also be defined by a user and stored in the control and evaluation unit. In the present embodiment, the conditions for the presence of a sensor error are: the valve curve deviates downward and the container is overfilled; or the valve curve deviates upward and the container is underfilled. If one of the conditions is detected, a sensor error is detected and issued. In addition, a request to replace the flow or fill level sensor 6, 8 is issued. Once the flow or fill level sensor 6, 8 has been replaced, the valve speed and valve curve of the filling valve 5, 7 can be detected again—101—and the filling system can go into control mode 106.

The invention claimed is:

1. A method for operating a filling system, wherein the filling system has at least one first filling point, at least one second filling point and at least one control and evaluation unit for controlling and monitoring the filling processes, wherein the first filling point has at least one first filling valve and at least one first flow or fill level sensor and wherein the second filling point has at least one second filling valve and at least one second flow or fill level sensor, and wherein a reference valve curve of the first filling valve and a reference valve curve of the second filling valve are stored in the control and evaluation unit, the method comprising:
   a determination step, in which the control and evaluation unit determines a current valve curve of the first filling valve and a current valve curve of the second filling valve in an operating state of the filling system;
   a comparison step, in which the control and evaluation unit compares the current valve curve of the first filling valve with the reference valve curve of the first filling valve and compares the current valve curve of the second filling valve with the reference valve curve of the second filling valve;
   an adjustment step, in which the control and evaluation unit adjusts the number of filling points at which the current valve curve differs from the associated reference valve curve; and
   a signaling step, in which the control and evaluation unit detects and signals a filling point error at the corresponding filling point in the event of a deviation of the valve curve from the reference valve curve at one filling point, and detects and signals a process error in the case of deviation of the valve curve from the reference valve curve at both filling points.

2. The method according to claim 1, wherein the control and evaluation unit has at least a first sub-unit and a second sub-unit;
   wherein the first sub-unit implements the control and monitoring of the first filling point and the second sub-unit implements the control and monitoring of the second filling point;
   wherein the first sub-unit and the second sub-unit are connected to one another via a communication channel; and
   wherein, in the adjustment step, the first sub-unit and the second sub-unit exchange and adjust deviation information of the current valve curves from the corresponding reference valve curves.

3. The method according to claim 1, wherein in the adjustment step, at least one of the measure and the direction of the deviation of the valve curves from the reference valve curves of the filling valves of the filling points is/are adjusted; and
   wherein in the signaling step, a process error is then detected and signaled, when at least one of: (i) the degree of deviation of the valve curves from the reference valve curves of both filling valves is within a predetermined tolerance range; and (ii) the direction of deviation of the valve curves from the reference valve curves of both filling valves is the same.

4. The method according to claim 1, wherein in the case of a deviation of the valve curves from the reference valve curves beyond a predetermined first tolerance range, the filling valves are recalibrated by adapting the valve curves of the respective filling valves.

5. The method according to claim 1, wherein in the event of a deviation of the valve curves from the reference valve curves beyond a predetermined second tolerance range, a serious process error is at least one of: (i) detected and signaled; and (ii) operation of the filling system is stopped.

6. The method according to claim 1, wherein a reference valve speed for at least one of the first filling valve and the second filling valve is stored in the control and evaluation unit; and
   wherein, in an additional step, the control and evaluation unit determines the valve speed of at least one of the first filling valve and the second filling valve and compares it with the reference valve speed of the corresponding filling valve, and that, in the event of a deviation of the valve speed from the reference valve speed, the corresponding filling valve is recalibrated.

7. The method according to claim 1, wherein, in the event of a filling point error being detected, the control and evaluation unit actuates the filling valve of the faulty filling point with a predetermined number and type of control commands and monitors the reaction of the filling valve to the control commands; and
   wherein, if the reaction of the filling valve deviates from the expected reaction, a valve error of a first type is detected at least one of: (i) with the filling point being put out of operation; and (ii) with a request for replacement of the filling valve being issued; or
   wherein, if the reaction of the filling valve does not deviate from the expected reaction, a valve error of a second type or a sensor error is detected at least one of: (i) with the filling point being put out of operation; and (ii) with a request for replacement of the filling valve and of the flow or level sensor being issued.

8. The method according to claim 1, wherein, in the event of a filling point error being detected, the faulty filling point is checked with the aid of an external testing means;
   wherein the fill level of the filled container is determined with the aid of an external testing means in order to check the filling point after a container has been filled and that a valve error or a sensor error is concluded on the basis of the degree of filling and the direction of the deviation of the valve curve from the reference valve curve;
   wherein at least one of: (i) the faulty filling point is put out of operation; and (ii) a request to replace the filling valve or to replace the flow or level sensor is issued.

9. A filling system, comprising:
   at least one first filling point;
   at least one second filling point; and
   at least one control and evaluation unit for controlling and monitoring the filling processes;
   wherein the first filling point has at least one first filling valve and at least one first flow or fill level sensor;
   wherein the second filling point has at least one second filling valve and at least one second flow or fill level sensor;
   wherein a reference valve curve of the first filling valve and a reference valve curve of the second filling valve are stored in the control and evaluation unit;
   wherein the control and evaluation unit is designed in such a way that, in a determination step, it determines a current valve curve of the first filling valve and a current valve curve of the second filling valve;
   wherein, in a comparison step, it compares the current valve curve of the first filling valve with the reference valve curve of the first filling valve and compares the current valve curve of the second filling valve with the reference valve curve of the second filling valve;
   wherein, in an adjustment step, it adjusts at how many of the filling points a deviation of the current valve curve from the associated reference valve curve occurs; and
   wherein, in a signaling step, in the event of a deviation of the valve curve from the reference valve curve at one filling point, it detects and signals a filling point error of the corresponding filling point, and in the case of a deviation of the valve curve from the reference valve curve at both filling points, it detects and signals a process error.

10. The filling system according to claim 9, wherein the control and evaluation unit has at least a first sub-unit and a second sub-unit;
    wherein the first sub-unit implements the controller of the first filling point and the second sub-unit implements the controller of the second filling point;
    wherein the first sub-unit and the second sub-unit are connected via a communication channel and are designed for the mutual exchange of data and communication;
    wherein the first sub-unit and the second sub-unit are designed in such a way that they exchange and adjust data relating to the state of the filling valves in the adjustment step.

11. The filling system according to claim 9, wherein at least one of:
    in the adjustment step, at least one of the measure and the direction of the deviation of the valve curves from the reference valve curves of the filling valves of the filling points is/are adjusted, and that in the signaling step, a process error is then detected and signaled, when at least one of: (i) the degree of deviation of the valve curves from the reference valve curves of both filling valves is within a predetermined tolerance range; and (ii) the direction of deviation of the valve curves from the reference valve curves of both filling valves is the same;
    in the case of a deviation of the valve curves from the reference valve curves beyond a predetermined first tolerance range, the filling valves are recalibrated by adapting the valve curves of the respective filling valves;
    in the event of a deviation of the valve curves from the reference valve curves beyond a predetermined second tolerance range, at least one of: (i) a serious process error is detected and signaled; and (ii) operation of the filling system is stopped;
    a reference valve speed for at least one of the first filling valve and the second filling valve is stored in the control and evaluation unit, and, in an additional step, the control and evaluation unit determines the valve speed of the first filling valve and/or of the second filling valve and compares it with the reference valve speed of the corresponding filling valve, and that, in the event of a deviation of the valve speed from the reference valve speed, the corresponding filling valve is recalibrated;
    in the event of a filling point error being detected, the control and evaluation unit actuates the filling valve of the faulty filling point with a predetermined number and type of control commands and monitors the reaction of the filling valve to the control commands, and, if the reaction of the filling valve deviates from the expected reaction, a valve error of a first type is detected with the filling point being put out of operation and/or with a request for replacement of the filling valve being issued, or, if the reaction of the filling valve does not deviate from the expected reaction, a valve error of a second type or a sensor error is detected with the filling point being put out of operation and/or with a request for replacement of the filling valve and of the flow or level sensor being issued; and in the event of a filling point error being detected, the faulty filling point is checked with the aid of an external testing means, the fill level of the filled container is determined with the aid of an external testing means in order to check the filling point after a container has been filled and that a valve error or a sensor error is concluded on the basis of the degree of filling and the direction of the deviation of the valve curve from the reference valve curve, and the faulty filling point is put out of operation and/or a request to replace the filling valve or to replace the flow or level sensor is issued.

* * * * *